United States Patent
Alvey et al.

(10) Patent No.: US 9,697,242 B2
(45) Date of Patent: Jul. 4, 2017

(54) BUFFERING INSERTS INTO A COLUMN STORE DATABASE

(71) Applicant: International Business Machines Corporation, Armonk, NY (US)

(72) Inventors: Walter D. Alvey, San Jose, CA (US); Matthew A. Huras, Ajax (CA); Sam B. Lightstone, Toronto (CA); Chandrasekaran Mohan, San Jose, CA (US); Steven R. Pearson, Portland, OR (US); James J. Seeger, Portland, OR (US); Richard S. Sidle, Mountain View, CA (US); David C. Smith, Mississauga (CA); Adam J. Storm, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 14/168,146

(22) Filed: Jan. 30, 2014

(65) Prior Publication Data
US 2015/0213071 A1 Jul. 30, 2015

(51) Int. Cl.
G06F 17/30 (2006.01)
(52) U.S. Cl.
CPC .............................. *G06F 17/30315* (2013.01)
(58) Field of Classification Search
CPC .................................................. G06F 17/30315
See application file for complete search history.

(56) References Cited

U.S. PATENT DOCUMENTS

| 5,179,662 A * | 1/1993 | Corrigan ............... G06F 5/16 365/189.05 |
| 5,615,362 A * | 3/1997 | Jensen ............. G06F 17/30607 |
| 6,847,971 B1 * | 1/2005 | Balaraman ........ G06F 17/30575 |
| 2011/0016157 A1 * | 1/2011 | Bear ................ G06F 17/30312 707/804 |
| 2012/0221528 A1 | 8/2012 | Renkes et al. |

(Continued)

OTHER PUBLICATIONS

Krueger et al., "Merging Differential Updates in In-Memory Column Store," DBKDA 2011: The Third International Conference on Advances in Databases, Knowledge, and Data Applications, 2011, pp. 1-6.

(Continued)

*Primary Examiner* — Jorge A Casanova
(74) *Attorney, Agent, or Firm* — Cantor Colburn LLP; Bryan W Butler

(57) ABSTRACT

Embodiments relate to database systems. An aspect includes deferring row insert operations until occurrence of a triggering event. One method includes receiving a row insert for a tuple into a column group store table, where the tuple includes one or more tuplets and each of the tuplets corresponds to a column group in the column group store table. The method also includes copying at least one of the tuplets into an insert buffer that is specific to one of the column groups in the column group store table. The method also includes deferring the row insert into the column group store table until an occurrence of one or more triggering events. The method also includes flushing the row insert into storage associated with the column group store table, in response to the occurrence of the one or more triggering events.

20 Claims, 5 Drawing Sheets

(56) References Cited

U.S. PATENT DOCUMENTS

2013/0060780 A1    3/2013  Lahiri et al.
2013/0166553 A1*   6/2013  Yoon .................. G06F 17/30312
                                                           707/737
2014/0172776 A1*   6/2014  Liu ..................... G06F 17/3048
                                                           707/600

OTHER PUBLICATIONS

Rasin et al., "An Automatic Physical Design Tool for Clustered Column-Stores," EDBT/ICDT '13, Mar. 18-22, 2013, Genoa, Italy, pp. 1-12.

* cited by examiner

BUFFERING INSERTS INTO A COLUMN STORE DATABASE

BACKGROUND

The present disclosure relates generally to database systems, and more specifically, to buffering inserts into a column store database.

A database table is conceptually a two-dimensional structure composed of cells arranged in rows and columns. Because computer memory and storage is structured as a series of linear pages, databases commonly use one of two options for storing sequences of cell values in contiguous memory locations. In a row store table, data is clustered in pages according to row. In a column store table, data is clustered in pages according to column. Column store database systems are often used for complex analytic query workloads because such queries typically must process massive amounts of data, yet require reading of only a small subset of the columns of the referenced tables. Column storage enables only those columns that are required by the query to be scanned, thus significantly reducing the time required to answer the query as compared to a row store database.

BRIEF SUMMARY

Embodiments include a method, system, and computer program product for deferring row insert operations for a database until occurrence of a triggering event. One method includes receiving a row insert for a tuple into a column group store table, where the tuple includes one or more tuplets and each of the tuplets corresponds to a column group in the column group store table. The method also includes copying at least one of the tuplets into an insert buffer that is specific to one of the column groups in the column group store table. The method also includes deferring the row insert into the column group store table until an occurrence of one or more triggering events. The method also includes flushing the row insert into storage associated with the column group store table, in response to the occurrence of the one or more triggering events.

One computer program product includes a computer readable storage medium having program code embodied therewith. The program code is executable by a processor for receiving a row insert for a tuple into a column group store table, where the tuple includes one or more tuplets and each of the tuplets corresponds to a column group in the column group store table. The program code is executable by a processor for copying at least one of the tuplets into an insert buffer that is specific to one of the column groups in the column group store table. The program code is executable by a processor for deferring the row insert into the column group store table until an occurrence of one or more triggering events. The program code is executable by a processor for flushing the row insert into storage associated with the column group store table, in response to the occurrence of the one or more triggering events.

One system includes a memory having computer readable computer instructions and a processor for executing the computer readable instructions. The instructions include receiving a row insert for a tuple into a column group store table, where the tuple includes one or more tuplets and each of the tuplets corresponds to a column group in the column group store table. The instructions include copying at least one of the tuplets into an insert buffer that is specific to one of the column groups in the column group store table. The instructions also include deferring the row insert into the column group store table until an occurrence of one or more triggering events. The instructions also include flushing the row insert into storage associated with the column group store table, in response to the occurrence of the one or more triggering events.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The preceding features, and advantages of the disclosure, as well as others, are apparent from the following detailed description taken in conjunction with the accompanying drawings in which:

DETAILED DESCRIPTION

Embodiments described herein are directed to buffering techniques for database tables that are organized as column stores or column group stores. Various embodiments maintain a page-level insert buffer for each column of a column table, or each column group of a column group table. Multiple row inserts into the table are buffered, and not flushed, until a buffer is full or until another operation triggers a flush. By buffering until more than one row has been inserted, the relatively expensive flush operation is amortized across multiple rows, resulting in better overall performance as compared to contemporary implementations. Writing once for multiple row operations also reduces the amount of time that a page remains fixed or latched in the storage layer. Some embodiments also defer and accumulate the log operation(s) associated with a row insert, thus further improving performance.

Figure 1:
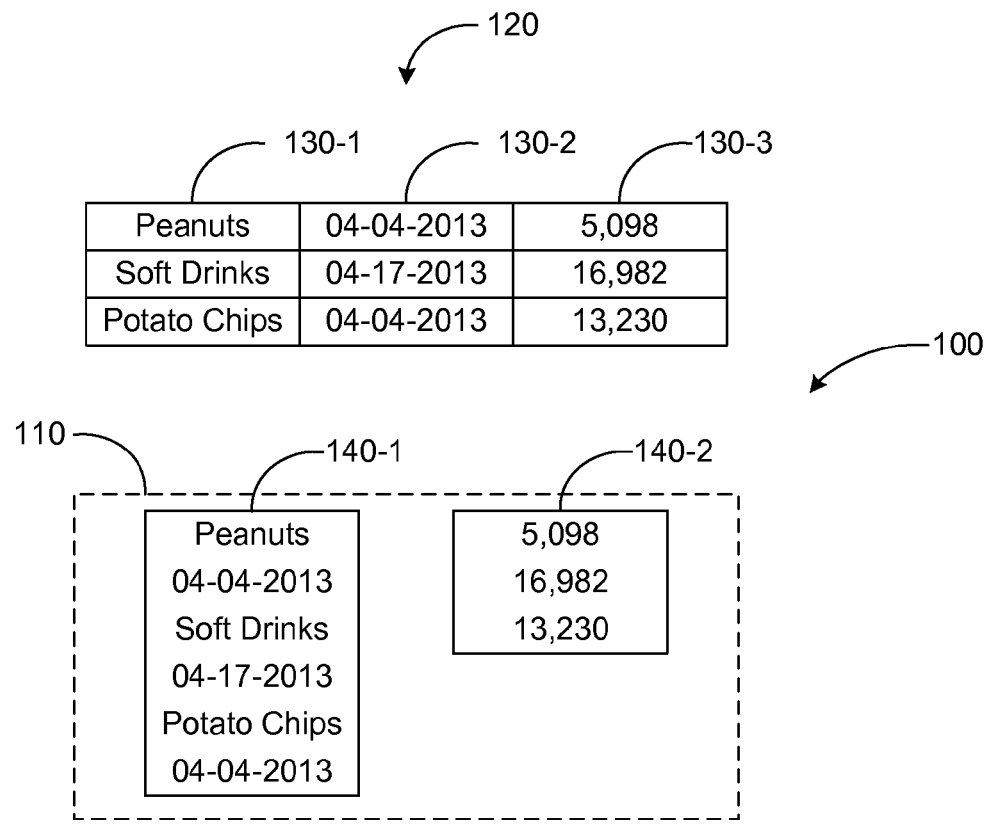
FIG. 1 depicts a block diagram of a database system in accordance with an embodiment.
Figure 1:
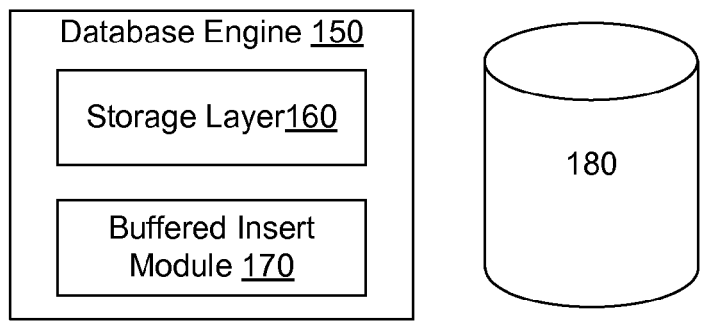

Turning now to FIG. 1, a block diagram of a database system in accordance with an embodiment is generally shown. System 100 includes a column store table 110. As can be seen in logical view 120, a database table such as the column store table 110 is conceptually a two-dimensional structure composed of cells arranged in rows and columns. However, computer memory and storage is structured as a series of linear pages. In the column store table 110, data is clustered in pages according to column or column group. In contrast, data in a row store table (not shown) is clustered in pages according to row.

As shown in the logical view 120, the column store table 110 in this example has three rows and three columns: a product column 130-1, a date column 130-2, and a quantity column 130-3. The column store table 110 in FIG. 1 is a column group store, in which a table is partitioned into a number of column groups. A column group may contain more than one column. Pages of the database storage contain data of all columns in the group. In this example the column store table 110 has two column groups: the first column group 140-1 includes product column 130-1 and date column 130-2; the second column group 140-2 includes quantity column 130-3. Since data in the column store table 110 is clustered in pages according to column groups, column store table 110 has page(s) for the first group (product and date), and pages for the second group (quantity). While the column store table 110 discussed in connection with FIG. 1 is a column group store, the embodiments described herein are also applicable to pure column stores, in which a page of the database storage contains data of only one column.

In addition to the column store table 110, the system 100 includes a database engine 150 that performs operations (e.g., insert, delete, join) and queries on the column store table 110. The database engine 150 in turn includes a storage layer 160 and a buffered insert module 170. The database engine 150 may also include other components which will not be discussed here, in order to better focus on the storage layer 160 and the buffered insert module 170.

The storage layer 160 allocates and manages storage for tables, such as storage used for data pages and index data pages. The storage layer 160 may write directly to permanent storage 180, such as a disk drive, or may perform caching of table data pages and/or index data pages.

The buffered insert module 170 provides caching that is especially appropriate for column stores, where inserting a row is more complex as compared to row-based stores. This complexity arises because the columnar storage layout of the column store table 110 implies that at least one page per column must be modified during the insert of a single row. For example, the column store table 110 shown in FIG. 1 includes three columns, so inserting a new row into the column store table 110 involves inserting a new value into the product column 130-1, inserting a new value into the date column 130-2, and inserting a new value into the quantity column 130-3. Since the column store table 110 is divided into two groups, this in turn involves writing to the page for the first column group 140-1 and writing to the page for the second column group 140-2.

A brief overview of the buffered insert module 170 follows, and its operation will then be discussed in more detail below in connection with FIGS. 2 and 3. The buffered insert module 170 buffers row insert operations for all column groups 140, using its own insert buffers, until a triggering event for the insert buffer occurs. Flushing the row insert into the column store table 110 is thus deferred until a triggering event, such as an insert buffer becoming full. Examples of other triggers will be discussed below. When a triggering event occurs, the buffered insert module 170 interacts with the storage layer 160 to write the insert buffer to a corresponding page managed by the storage layer 160. The buffered insert module 170 pre-allocates these pages in the storage layer 160 at the time of the row insert, thus ensuring that a page is available at the time of the flush.

By deferring writes to storage layer pages until data for more than one row insert has been collected, the buffered insert module 170 provides a level of caching. Avoiding a write to multiple storage layer pages every time a row is inserted allows the buffered insert module 170 to reduce the total number of writes to the storage layer by amortizing the writes across multiple row insertions. Reducing the number of writes to the storage layer pages may greatly impact performance because each is fixed before access and unfixed after access, which adds a significant amount of codepath. Deferring writes also means that control can return to the caller after the row insert or update operation, so the caller may submit further operations that are also buffered until a flush occurs. Thus, the user may issue multiple row inserts and/or updates in one transaction, and the embodiments described herein may perform as few as one flush for these multiple operations, depending on the circumstances.

As pages managed by the storage layer 160 are modified by operations such as a row insert, the changes are logged to a transaction log in order to provide error recovery. Some embodiments of the buffered insert module 170 also aggregate and defer the logging of changes to modified storage layer pages. Because conventional techniques use one log record for each modified storage layer page, grouping row inserts into fewer log records can reduce what is otherwise substantial logging overhead.

Figure 2:
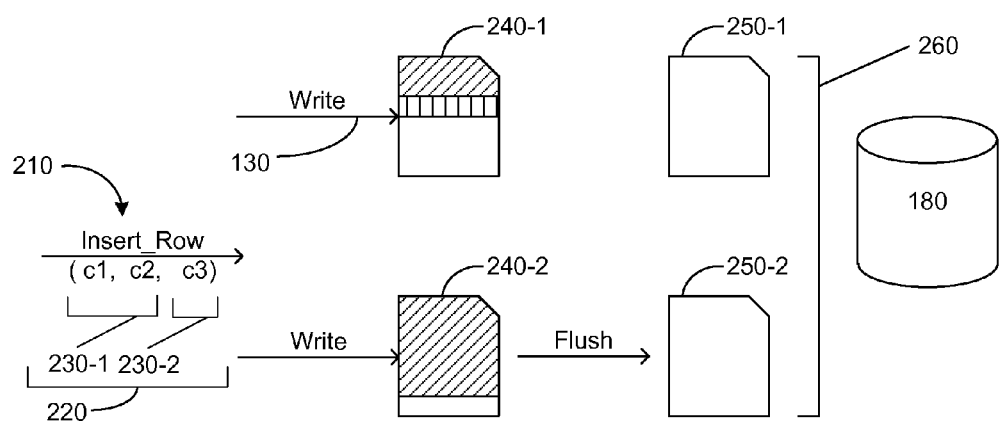
FIG. 2 depicts a usage scenario in accordance with an embodiment.

Referring to FIG. 2, a diagram illustrating interactions between the buffered insert module 170 and the storage layer 160 in a usage scenario, in accordance with an embodiment, is generally shown. As noted above, the database engine 150 supports various operations on the column store table 110 (FIG. 1). In accordance with an embodiment, when an application requests a row insert operation 210 on a column store table 110, the buffered insert module 170 (FIG. 1) is invoked. The row insert operation 210 specifies a tuple 220, that is, a group of values for the columns in the column store table 110. The tuple 220 is made up of one or more tuplets 230, one for each column group 140. In the example of FIG. 2, the tuple 220 includes a tuplet 230-1 for the first column group 140-1 (columns 130-1 and 130-2 in FIG. 1), and a tuplet 230-2 for the second column group (column 130-3 in FIG. 1). In some embodiments, the application specifies the entire tuple 220 when using the row insert operation 210. In other embodiments, the application may specify less than all of the tuplets 230, in which case the remaining columns in the row are filled with default values.

The buffered insert module 170 maintains an insert buffer 240 for each column group 140 in the column store table 110: an insert buffer 240-1 for the first column group 140-1 (FIG. 1); and an insert buffer 240-2 for the second column group 140-2. This arrangement is used with column group stores. In embodiments using a pure column store, the buffered insert module 170 maintains an insert buffer 240 for each column 130.

Before an initial write to an insert buffer 240, the buffered insert module 170 allocates a page 250 in the storage layer pool 260. Thus, each insert buffer 240 has an associated storage layer page 250 that is managed by the storage layer 160. In some embodiments, the insert buffer 240 is the same size as a storage layer page 250, in which case flushing of a single insert buffer 240 affects only a single storage layer page 250. In some embodiments, the insert buffer 240 uses the same data format as the storage layer page 250. Buffer allocation will be discussed in more detail below.

In response to a row insert operation 210, the buffered insert module 170 copies each tuplet 230 to its corresponding insert buffer 240. If the insert buffer 240 does not have enough room for the data in the tuplet 230, then the buffered insert module 170 flushes the insert buffer 240 to the associated storage layer page 250. The storage layer module 160, in turn, takes care of writing the page 250 to the permanent storage 180 (which may occur at a future time). Since each column group 140 has a separate insert buffer 240, this flushing occurs independently for each column group 140. The flushing may occur at different times, since the insert buffers 240 may fill up at different rates based on the relative size and storage efficiency of the different column groups 140.

Figure 3:
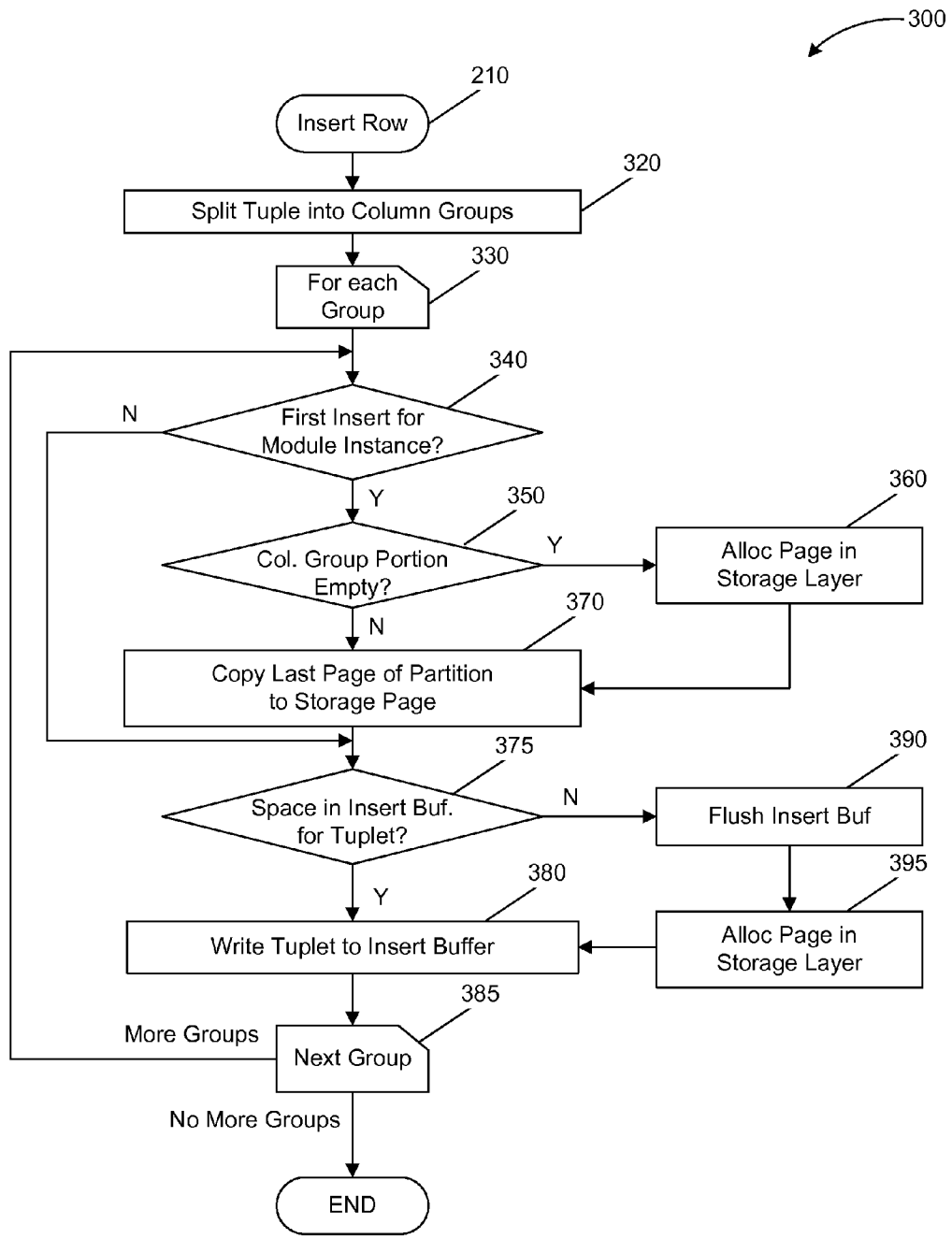
FIG. 3 depicts a process flow for the buffered insert module in accordance with an embodiment.

Moving on to FIG. 3, a flowchart illustrating operation of the buffered insert module 170 in accordance with an embodiment is generally shown. The process 300 begins when an application or other caller requests an InsertRow operation 210, specifying a tuple 220 (FIG. 2) and a column store table 110 (FIG. 1). At block 320, the tuple 220 is partitioned into column groups 140. In some embodiments, the tuple 220 is compressed after partitioning. In some embodiments, control is returned to the caller at this point, while the buffered insert module 170 continues execution asynchronously.

At block 330, the buffered insert module 170 begins an iteration over each column group 140. At block 340, the buffered insert module 170 determines whether this row insertion operation 210 is the first for this insert module 170 instance. If this row insertion is the first for the instance, processing continues at block 350, where the buffered insert module 170 determines whether the column group portion for the table is empty. In some embodiments, the column store table 110 is divided into multiple partitions called insert ranges, where an extent of pages for a column belongs to exactly one insert range. In such embodiments, the column group portion referred to above may correspond to an insert range. In other embodiments, the column group portion corresponds to a range. In still other embodiments, the column group portion corresponds to a hash partitioning of the table.

If the column group portion is empty, processing continues at block 360, where a page 250 from the storage layer 260 is allocated. In some embodiments, a log record is also allocated at this time. Once the page 250 is allocated, processing continues at block 370. At block 370, which is also reached from block 350 if the column group portion is not empty, the storage layer 260 is initialized with the last page of the column group portion.

Block 375 is reached after preparing for the first row insertion (blocks 350, 360, and 370), or after determining (at block 340) that the row insertion is not the first. At block 375, it is determined whether the space remaining in the insert buffer 240 associated with the current column group 140 is enough to store the current tuplet 230. If enough space remains, the current tuplet 230 is copied to the insert buffer 240 at block 380, and then the iteration loop continues at block 385 for the next column group 140. When all column groups 140 for the insert row request 210 have been processed, the process 300 ends.

If at block 375 it is determined that the insert buffer 240 does not have room for the current tuplet 230, processing continues at block 390, where the insert buffer 240 is flushed. The flush operation is described in connection with FIG. 4. Once the data is flushed from the insert buffer 240, processing continues at block 395 where a new page 250 from the storage layer 260 is allocated. Processing continues at block 380 where the current tuplet 230 is copied to the insert buffer 240. The iteration loop then continues at block 385 for the next column group 140. When all column groups 140 for the insert row request 210 have been processed, the process 300 ends.

Figure 4:
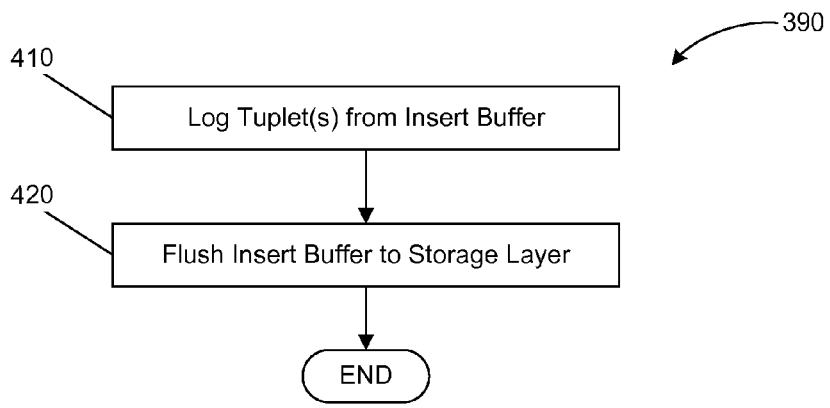
FIG. 4 depicts a process flow for the flush operation in accordance with an embodiment.

Turning now to FIG. 4, a flowchart illustrating a flush operation 390 of the buffered insert module 170 in accordance with an embodiment is generally shown. At block 410, the buffered insert module 170 writes log records for those tuplets 230 that have been newly inserted into the insert buffer 240. In some embodiments, this logging uses only a single log record. Next, at block 420, the insert buffer 240 is flushed to the storage layer 260. More specifically, the insert buffer 240 is flushed to the storage layer page 250 that was reserved at block 360.

As noted above, this storage layer page 250 is pre-allocated before copying any data to the insert buffer 240, thus ensuring enough space for the inserted data at the time of the flush. If the storage layer page 250 is empty at the time of the flush, the flush at block 420 may correspond to a copy. In some embodiments, if the storage layer page 250 contains other data at the time of the flush, the flush involves selectively adding the data from the insert buffer 240 to the end of the storage layer page 250 (i.e., a merge of the old contents and the new contents). In some embodiments, this flush operation is performed by the storage layer module 160, and involves fixing the page 250 before writing the data from insert buffer 240 and unfixing the page 250 after writing.

To avoid affecting application semantics, the flush operation should not fail. Therefore, some embodiments handle the error condition of a full storage layer 260 encountered during the flush operation by re-attempting the write indefinitely. Doing so ensures that the full storage layer condition does not escalate into a buffer flush failure. Some embodiments also reserve log space before the flush operation to ensure that the flush operation does not fail for lack of log space. Then, when the flush operation eventually occurs, the reserved log space is used to write the log record. Any additional space that was reserved in the storage layer is freed at that time.

Figure 5:
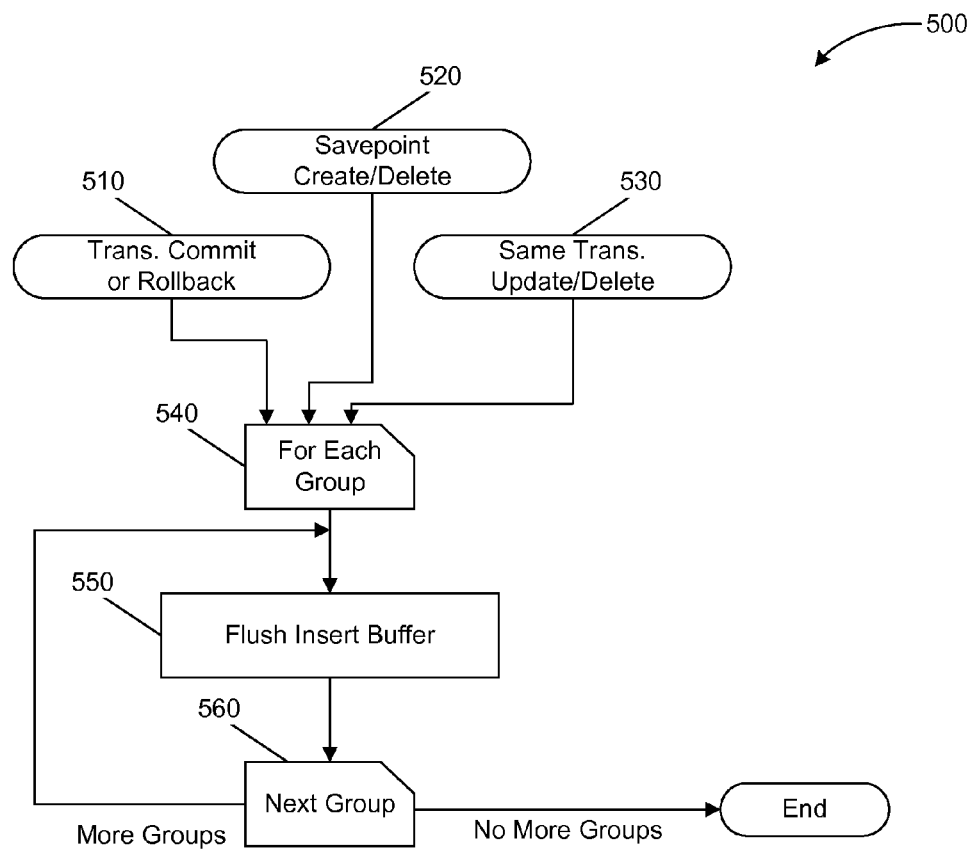
FIG. 5 depicts event handling associated with the flush operation in accordance with an embodiment.

Moving on to FIG. 5, a diagram illustrating flush event handling of the buffered insert module 170 for events other than a full insert buffer 240, in accordance with an embodiment is generally shown. Such events may be understood as downstream events that result in a flush. In contrast, the flush that occurs when a buffer is full may be considered an inline flush. The event handler 500 is triggered by several different events: when a transaction is committed or rolled back 510; when a user savepoint is created or terminated 520; and when an update or delete statement is issued 530 within the same transaction as the insert row operation 210 (FIG. 2) and the target of the update or delete is the insert buffer 240 involved in the row insert. As shown in FIG. 5, such events lead to iteration over all column groups 140 for flushing. At block 540, the iteration loop begins with the first column group 140. Next, at block 550 the flush operation 390 as described earlier in connection with FIG. 4 is performed for the current column group 140. At block 560, it is determined whether all column groups 140 have been handled. If No, processing continues at block 550 with the next column group 140. If Yes, the flush event processing is complete.

Row insertion can result in various types of expected and tolerable errors. A representative but non-limiting list includes uniqueness violations, type correctness violations, and nullability violations. In some embodiments of buffered row insertions, error checking is performed when values are copied to an insert buffer. In other embodiments, values are unconditionally copied to the insert buffer and error checking is deferred until the flush operation.

Complicated error semantics can result when deferred error checking is used. For example, consider the case where an insert buffer is filled, without error checking, with three column values (A, B, and C). An insert statement arrives to insert a row with column value D, and this operation causes the insert buffer to become full. Error checking is performed as part of the buffer flush, and it is determined that column B cannot be inserted (e.g., due to a uniqueness violation). At this point, the insert buffer cannot be flushed in its entirety. Furthermore, B is only one column in the table, and other column values that are part of the same row as B will be present in other insert buffers and may already have been flushed. Some deferred error checking embodiments handle such cases by rolling back the transaction containing the insert statement, which could imply a change in application semantics. To avoid such a change in semantics, some embodiments perform error checking before column values are written to the insert buffers.

Figure 6:
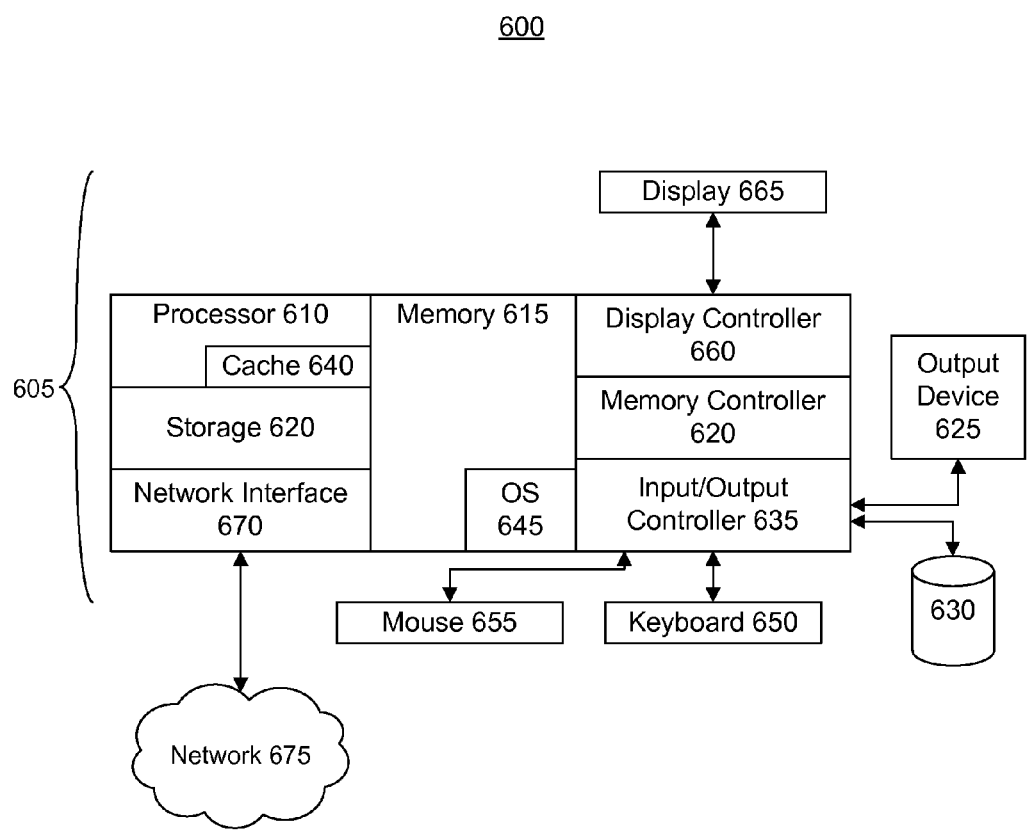
FIG. 6 depicts a block diagram of a computer system for use in practicing the teachings herein.

FIG. 6 illustrates a block diagram of a computer system 600 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 600 therefore includes general-purpose computer 605.

In an exemplary embodiment, in terms of hardware architecture, as shown in FIG. 6, the general-purpose computer 605 includes a processor 610, memory 615 coupled to a memory controller 620, and one or more input and/or output (I/O) devices 625, 630 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 610 is a hardware device for executing hardware instructions or software, particularly that stored in memory 615. The processor 610 can be any custom made or commercially available processor, a central processing unit (CPU), an auxiliary processor among several processors associated with the general-purpose computer 605, a semiconductor based microprocessor (in the form of a microchip or chip set), a macroprocessor, or generally any device for executing instructions. The processor 610 includes a cache 640, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 640 may be organized as a hierarchy of more cache levels (L1, L2, etc.).

The memory 615 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 615 may incorporate electronic, magnetic, optical, and/or other types of storage media. Note that the memory 615 can have a distributed architecture, where various components are situated remote from one another, but can be accessed by the processor 610.

The instructions in the memory 615 may include one or more separate programs, each of which comprises an ordered listing of executable instructions for implementing logical functions. In the example of FIG. 6, the instructions in the memory 615 include a suitable operating system (OS) 645. The operating system 645 essentially controls the execution of other computer programs and provides scheduling, input-output control, file and data management, memory management, and communication control and related services. The tables described herein may be stored in the memory 615.

In an exemplary embodiment, a conventional keyboard 650 and mouse 655 can be coupled to the input/output controller 635. Other output devices such as the I/O devices 625, 630 may include input devices, for example but not limited to a printer, a scanner, microphone, and the like. Finally, the I/O devices 625, 630 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The computer system 600 can further include a display controller 660 coupled to a display 665. In an exemplary embodiment, the computer system 600 can further include a network interface 670 for coupling to a network 675. The network 675 can be an IP-based network for communication between general-purpose computer 605 and any external server, client and the like via a broadband connection. The network 675 transmits and receives data between the computer 605 and external systems. In an exemplary embodiment, the network 675 can be a managed IP network administered by a service provider. The network 675 may be implemented in a wireless fashion, e.g., using wireless protocols and technologies, such as WiFi, WiMax, etc. The network 675 can also be a packet-switched network such as a local area network, wide area network, metropolitan area network, Internet network, or other similar type of network environment. The network 675 may be a fixed wireless network, a wireless local area network (LAN), a wireless wide area network (WAN) a personal area network (PAN), a virtual private network (VPN), intranet or other suitable network system and includes equipment for receiving and transmitting signals.

If the general-purpose computer 605 is a PC, workstation, intelligent device or the like, the instructions in the memory 615 may further include a basic input output system (BIOS) (omitted for simplicity). The BIOS is a set of essential routines that initialize and test hardware at startup, start the OS 645, and support the transfer of data among the hardware devices. The BIOS is stored in ROM so that the BIOS can be executed when the computer 605 is activated. When the computer 605 is in operation, the processor 610 is configured to execute instructions stored within the memory 615, to communicate data to and from the memory 615, and to generally control operations of the computer 605 pursuant to the instructions.

Technical effects and benefits include the ability to buffer row inserts until an event occurs that triggers a flush of the rows to the storage layer. This may lead to better performance as compared to contemporary implementations by amortizing the relatively expensive flush operation across multiple rows. Writing once for multiple row operations may also reduce the amount of time that a page remains fixed or latched in the storage layer.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving a row insert for a tuple into a column group store table, the tuple comprising a plurality of tuplets, each of the plurality of tuplets corresponding to one of a plurality of column groups in the column group store table;
   copying each of the plurality of tuplets into one of a plurality of insert buffers that correspond to one of the plurality of column groups in the column group store table;
   deferring the row insert from the plurality of insert buffers into the corresponding one of the plurality of column groups in the column group store table until an occurrence of one or more triggering events; and
   in response to the occurrence of the one or more triggering events, flushing the one of the plurality of insert buffers into storage associated with the column group store table, wherein the flushing of each of the plurality of insert buffers into the storage associated with the column group store table occurs independently for each of the plurality of column groups.

2. The method of claim 1, wherein the flushing the one of the plurality of insert buffers comprises flushing the one of the plurality of insert buffers into a storage layer page associated with the column group store table.

3. The method of claim 1, wherein the flushing the one of the plurality of insert buffers comprises logging the row insert.

4. The method of claim 1, wherein the triggering events include the one of the plurality of insert buffers reaching full.

5. The method of claim 1, wherein the one of the plurality of insert buffers has a size that is equal to a page size of the storage associated with the column group store table.

6. The method of claim 1, wherein the one of the plurality of insert buffers has a same format as a page of the storage associated with the column group store table.

7. The method of claim 1, wherein the one or more triggering events includes at least one of a commit of the row insert, a rollback of the row insert, a creation of a user savepoint, a termination of a user savepoint, and a statement issued in a transaction that is in common with the row insert and the insert buffer is a target of the statement, wherein the statement corresponds to at least one of an update statement and a delete statement.

8. The method of claim 1, further comprising:
   allocating a page in a storage layer associated with the column group store table before the flushing; and
   associating the page in the buffer storage layer with the insert buffer.

9. A computer program product for buffering row inserts, the computer program product comprising:
   a computer readable storage medium having program code embodied therewith, the program code executable by a processor for:
   receiving a row insert for a tuple into a column group store table, the tuple comprising a plurality of tuplets, each of the plurality of tuplets corresponding to one of a plurality of column groups in the column group store table;
   copying each of the plurality of tuplets into one of a plurality of insert buffers that correspond to one of the plurality of column groups in the column group store table;
   deferring the row insert from the plurality of insert buffers into the corresponding one of the plurality of column groups in the column group store table until an occurrence of one or more triggering events; and
   in response to the occurrence of the one or more triggering events, flushing the one of the plurality of insert buffers into storage associated with the column group store table, wherein the flushing of each of the plurality of insert buffers into the storage associated with the column group store table occurs independently for each of the plurality of column groups.

10. The computer program product of claim 9, wherein the flushing the one of the plurality of insert buffers comprises flushing the one of the plurality of insert buffers into a storage layer page associated with the column group store table.

11. The computer program product of claim 9, wherein the flushing the one of the plurality of insert buffers comprises logging the row insert.

12. The computer program product of claim 9, wherein the one or more triggering events includes the one of the plurality of insert buffers reaching full.

13. The computer program product of claim 9, wherein one of the plurality of insert buffers has a size that is equal to a page size of the storage associated with the column group store table.

14. The computer program product of claim 9, wherein one of the plurality of insert buffers has a same format as a page of the storage associated with the column group store table.

15. The computer program product of claim 9, wherein the one or more triggering events includes at least one of a commit of the row insert operation, a rollback of the row insert operation, creation of a user savepoint, deletion of a user savepoint, and a statement issued in a transaction that is in common with the row insert and the insert buffer is a target of the statement, wherein the statement corresponds to at least one of an update statement and a delete statement.

16. A system comprising:
   a memory having computer readable computer instructions; and
   a processor for executing the computer readable instructions, the instructions including:
   receiving a row insert for a tuple into a column group store table, the tuple comprising a plurality of tuplets, each of the plurality of tuplets corresponding to one of a plurality of column groups in the column group store table;
   copying each of the plurality of tuplets into one of a plurality of insert buffers that correspond to one of the plurality of column groups in the column group store table;
   deferring the row insert from the plurality of insert buffers into the corresponding one of the plurality of column groups in the column group store table until an occurrence of one or more triggering events; and
   in response to the occurrence of the one or more triggering events, flushing the one of the plurality of insert buffers into storage associated with the column group store table, wherein the flushing of each of the plurality of insert buffers into the storage associated with the column group store table occurs independently for each of the plurality of column groups.

17. The system of claim 16, wherein the flushing the one of the plurality of insert buffers comprises flushing the one of the plurality of insert buffers into a storage layer page associated with the column group store table.

18. The system of claim 16, wherein the flushing the one of the plurality of insert buffers comprises logging the row insert.

19. The system of claim 16, wherein the at least one triggering events includes the one of the plurality of insert buffers reaching full.

20. The system of claim 16, wherein the one or more triggering events includes at least one of a commit of the row insert operation, a rollback of the row insert operation, creation of a user savepoint, and deletion of a user savepoint, and a statement issued in a transaction that is in common with the row insert and the insert buffer is a target of the statement, wherein the statement corresponds to at least one of an update statement and a delete statement.

* * * * *